United States Patent
Suciu et al.

(10) Patent No.: US 10,179,377 B2
(45) Date of Patent: Jan. 15, 2019

(54) PROCESS FOR MANUFACTURING A GAMMA TITANIUM ALUMINIDE TURBINE COMPONENT

(71) Applicant: UNITED TECHNOLOGIES CORPORATION, Hartford, CT (US)

(72) Inventors: Gabriel L Suciu, Glastonbury, CT (US); Gopal Das, Simsbury, CT (US); Ioannis Alvanos, West Springfield, MA (US); Brian D Merry, Andover, CT (US); James D Hill, Tolland, CT (US); Allan R Penda, Amston, CT (US)

(73) Assignee: United Technologies Corporation, Farmington, CT (US)

( * ) Notice: Subject to any disclaimer, the term of this patent is extended or adjusted under 35 U.S.C. 154(b) by 612 days.

(21) Appl. No.: 14/775,964

(22) PCT Filed: Dec. 30, 2013

(86) PCT No.: PCT/US2013/078182
§ 371 (c)(1),
(2) Date: Sep. 14, 2015

(87) PCT Pub. No.: WO2014/149122
PCT Pub. Date: Sep. 25, 2014

(65) Prior Publication Data
US 2016/0023307 A1   Jan. 28, 2016

Related U.S. Application Data

(60) Provisional application No. 61/787,929, filed on Mar. 15, 2013.

(51) Int. Cl.
*B23K 26/342* (2014.01)
*B22F 3/105* (2006.01)
(Continued)

(52) U.S. Cl.
CPC .......... *B23K 26/342* (2015.10); *B22F 3/1055* (2013.01); *B22F 5/009* (2013.01);
(Continued)

(58) Field of Classification Search
CPC .......................... B23K 26/342; B22F 3/1055
(Continued)

(56) References Cited

U.S. PATENT DOCUMENTS 5,364,513 A * 11/1994 Sekhar ............... C04B 41/5025
204/244
5,372,663 A * 12/1994 Shibue ..................... B22F 3/12
148/669
(Continued)

FOREIGN PATENT DOCUMENTS

DE    102011008809 A1    7/2012
EP       2692464 A2      2/2014

OTHER PUBLICATIONS

Hernandez et al.; Microstructures for Two-Phase Gamma Titanium Aluminide Fabricated; By Electron Beam Melting; Metallography, Microstructure and Analysis; Feb. 28, 2012; vol. 1, Issue 1, p. 14-27.
(Continued)

*Primary Examiner* — Samuel M Heinrich
(74) *Attorney, Agent, or Firm* — Bachman & LaPointe, PC

(57) ABSTRACT

A process for manufacturing a turbine engine component includes the steps of: providing a powder containing gamma titanium aluminide; and forming a turbine engine component from said powder using a direct metal laser sintering technique.

5 Claims, 1 Drawing Sheet

(51) Int. Cl.
  *B22F 5/00* (2006.01)
  *C22C 1/04* (2006.01)
  *B33Y 10/00* (2015.01)

(52) U.S. Cl.
  CPC ............ *B33Y 10/00* (2014.12); *C22C 1/0458* (2013.01); *C22C 1/0491* (2013.01); *Y02P 10/295* (2015.11)

(58) Field of Classification Search
  USPC ............. 219/121.63–121.66, 121.83, 121.85
  See application file for complete search history.

(56) References Cited

U.S. PATENT DOCUMENTS

| | | | |
|---|---|---|---|
| 5,540,792 A | 7/1996 | Quadakkers et al. | |
| 5,609,698 A | 3/1997 | Kelly et al. | |
| 5,634,992 A | 6/1997 | Kelly et al. | |
| 5,823,243 A | 10/1998 | Kelly | |
| 6,231,699 B1 | 5/2001 | Kelly et al. | |
| 7,114,917 B2 | 10/2006 | Legg | |
| 7,413,620 B2 | 8/2008 | Kelly | |
| 7,438,523 B2 | 10/2008 | Pickert et al. | |
| 8,506,836 B2 * | 8/2013 | Szuromi | B22F 3/1055 216/102 |
| 9,039,917 B2 * | 5/2015 | Szuromi | B22F 3/1055 216/102 |
| 2007/0107202 A1 | 5/2007 | Das | |
| 2010/0000635 A1 | 1/2010 | Appel et al. | |
| 2011/0189026 A1 | 8/2011 | Smarsly et al. | |

OTHER PUBLICATIONS

European Extended Search Report dated Oct. 3, 2016, issued in the corresponding European Patent Application No. 13878807.0.
Aluminides L Loeber et al: Comparison of Selective Laser and Electron Beam Melted Titanium, Jan. 1, 2011, XP055107179, URL:http://utwired.engr.utexas.edu/lff/symposium/proceedingsArchive/pubs/Manuscripts/2011/2011-43-Loeber.pdf, pp. 547-556.
H.F. Chladil et al: Characterization of a [beta]-Solidified [gamma]-TiAl alloy, BHM Berg-UND Huttenmannische Monatshefte, vol. 151, No. 9, Sep. 1, 2006, pp. 356-361; XP055008248, ISSN: 0005-8912, DOI: 10.1007/BF03165196.

* cited by examiner

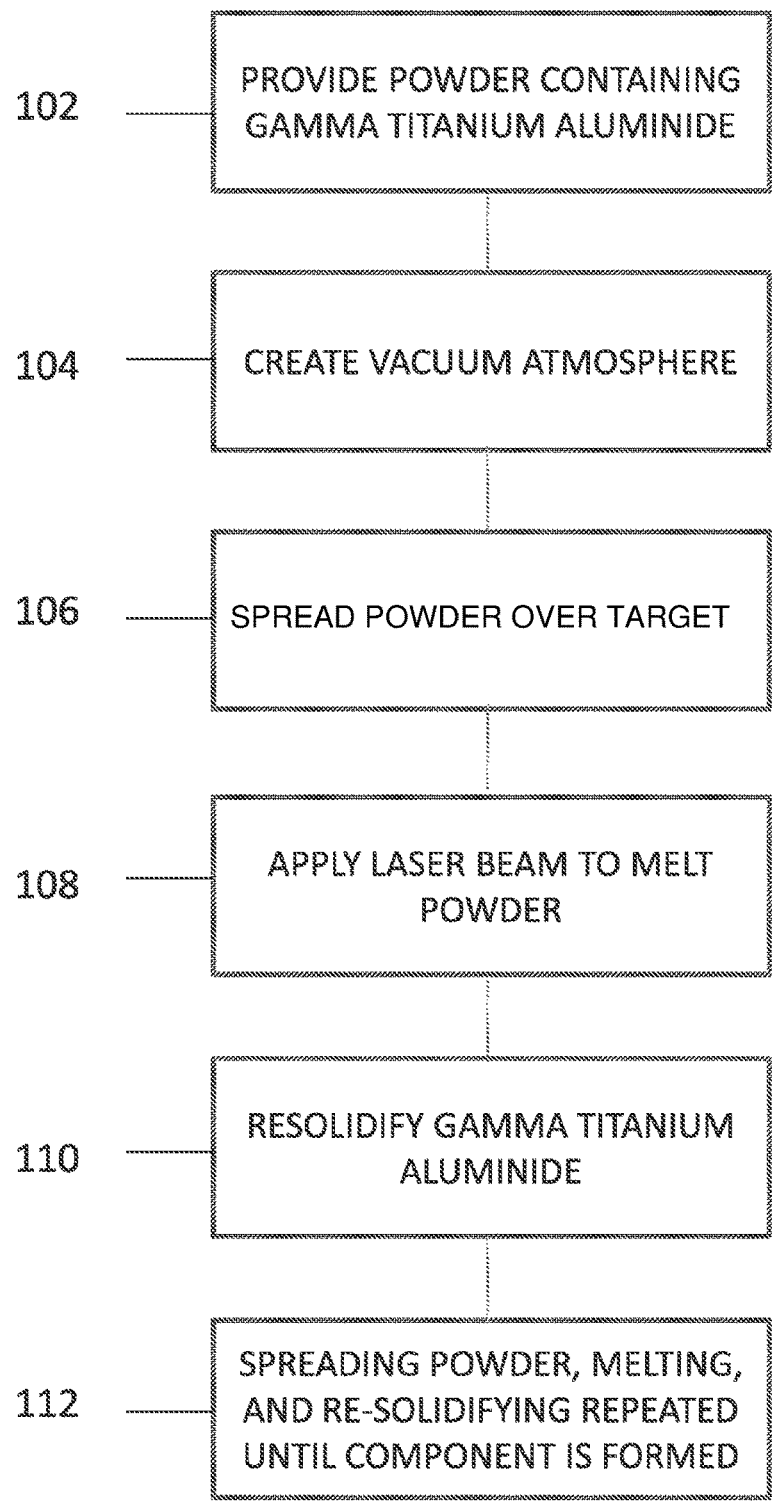

PROCESS FOR MANUFACTURING A GAMMA TITANIUM ALUMINIDE TURBINE COMPONENT

CROSS REFERENCE TO RELATED APPLICATION

This application claims the benefit of provisional application Ser. No. 61/787,929, filed Mar. 15, 2013.

BACKGROUND

The present disclosure relates to a process for manufacturing a turbine engine component from gamma titanium aluminide.

Turbine components, such as turbine vanes, are typically produced from nickel alloys which possess a high density. Clusters of such components as vanes based on the high density causes the overall weight of the assembly to be high. The high weight applies a load to the case causing even more mass to be added to the case and surrounding structure increasing the system weight and performance debits.

Producing turbine components from lighter weight material is desirable.

SUMMARY

In accordance with the present disclosure, there is provided a process for manufacturing a turbine engine component which broadly comprises the steps of: providing a powder containing gamma titanium aluminide; and forming a turbine engine component from said powder using a direct metal laser sintering technique.

In another and alternative embodiment, the forming step comprises forming a turbine vane.

In another and alternative embodiment, the forming step comprises spreading a layer of said gamma titanium aluminide powder on a platform and directing an energy beam onto selected areas of the gamma titanium aluminide powder to thereby melt the powder.

In another and alternative embodiment, the forming step further comprises re-solidifying the gamma titanium aluminide by withdrawing the energy beam.

In another and alternative embodiment, the forming process further comprises repeating the spreading, directing, and re-solidying steps to build up layers forming the turbine engine component.

In another and alternative embodiment, the powder providing step comprises providing a powder of an alloy having a composition consisting of 43.5 at % Al, 4.0 at % Nb, 1.0 at % Mo, 0.2 at % B, bal Ti.

Other details of the process for manufacturing a gamma titanium aluminide turbine component are set forth in the following detailed description and the accompanying drawing wherein like reference numerals depict like elements.

BRIEF DESCRIPTION OF THE DRAWINGS

The FIGURE illustrates the method for manufacturing a turbine engine component.

DETAILED DESCRIPTION

The FIGURE illustrates the method for manufacturing a turbine engine component from a powder consisting of a gamma titanium aluminide material. In step 102, the powder containing the gamma titanium aluminide is provided. The powder could be a gamma titanium aluminide alloy having a composition consisting of 43.5 at % Al, 4.0 at % Nb, 1.0 at % Mo, 0.2 at % B, bal Ti. The powder may have particles that are nearly identical in both size and sphericity and free of any internal porosity. The powder particles may have a size in the range of from 10 to 100 microns, although particle size may vary depending on the specifications of the component to be built.

The method used to form the turbine engine component is a direct metal laser sintering technique. In this technique, an apparatus to provide directed energy to melt the gamma titanium aluminide powder is provided. The apparatus to melt the gamma titanium aluminide powder could be any commercially acceptable laser capable of melting the aforementioned powder with or without preheating a powder bed. The apparatus may also include a scanning control means capable of tracing a programmed scan path so that only selected portions of the gamma titanium aluminide powder are melted. A particular example of a laser which can be used is a continuous wave NdrYAG laser with a beam diameter on the order of 100 to 500 microns.

In employing the method, a vacuum atmosphere on the order of $10^{-3}$ Torr may be created within a fabrication chamber in step 104. Such a partial pressure atmosphere may be achieved by evacuating the chamber to a high vacuum level in the range of from $5\times10^{-7}$ to $1\times10^{-5}$ Torr followed by a backfill to partial pressure with an inert gas such as helium or argon.

An apparatus for delivering the gamma titanium aluminide powder into the chamber is provided. The powder delivery apparatus may comprises part and feed side powder cylinders, a powder delivery roller and associated actuators.

The gamma titanium aluminide powder is spread over a target surface in the chamber in step 106. A directed energy beam is then provided by the laser in step 108. The energy beam scans along a path having a desired configuration. The energy beam melts the selected portion of the powder. In step 110, the energy beam is turned off and withdrawn, and the gamma titanium aluminide re-solidifies. Another layer of powder is then deposited and spread over the previous layer. The additional layer is then melted along with a portion of the previous layer. As shown in box 112 of the FIGURE, the steps of depositing and spreading the powder, melting the powder, and re-solidifying the gamma titanium aluminide are repeated until the desired turbine engine component, such as a vane, is formed layer by layer.

The method described herein allows the fabrication of a turbine engine component in a shorter time period.

The use of a gamma titanium aluminide as a vane material allows for the case to be lighter in weight, while improving performance. Gamma titanium aluminide is a material which has a density which is about half that of a nickel alloy.

There has been provided a process for manufacturing a gamma titanium aluminide turbine component. While the process for manufacturing the gamma titanium aluminide turbine component has been described in the context of specific embodiments thereof, other unforeseen alternatives, modifications, and variations may become apparent to those skilled in the art having read the foregoing description. It is intended to embrace those alternatives, modifications, and variations as fall within the broad scope of the appended claims.

What is claimed is:

1. A process for manufacturing a turbine engine component comprising the steps of:

providing a powder containing gamma titanium aluminide; and forming a turbine engine component from said powder using a direct metal laser sintering technique, wherein said powder providing step comprises providing a powder of an alloy having a composition consisting of 43.5 at % Al, 4.0 at % Nb, 1.0 at % Mo, 0.2 at % B, bal Ti.

2. The process of claim 1, wherein said forming step comprises forming a turbine vane.

3. The process of claim 1, wherein said forming step comprises spreading a layer of said gamma titanium aluminide powder on a platform and directing an energy beam onto selected areas of said gamma titanium aluminide powder to thereby melt the powder.

4. The process of claim 3, wherein said forming step further comprises re-solidifying said gamma titanium aluminide by withdrawing said energy beam.

5. The process of claim 4, wherein said forming process further comprises repeating said spreading, directing, and re-solidying steps to build up layers forming said turbine engine component.

\* \* \* \* \*